Figure 1:
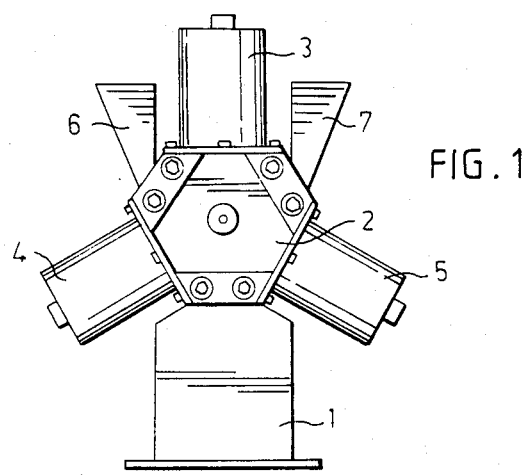

United States Patent [19]

Kirjavainen

[11] Patent Number: 4,565,510

[45] Date of Patent: Jan. 21, 1986

[54] DOUBLE EXTRUDER FOR THE PRODUCTION OF A TWO-LAYER TUBULAR EXTRUDED PRODUCT

[75] Inventor: Kari J. Kirjavainen, Helsinki, Finland

[73] Assignee: Oy Nokia AB, Helsinki, Finland

[21] Appl. No.: 694,207

[22] Filed: Jan. 24, 1985

[30] Foreign Application Priority Data

Feb. 24, 1984 [FI] Finland .................................. 840759

[51] Int. Cl.[4] ...................... B29C 39/14; B29C 47/06; B29C 47/10; B29C 47/46
[52] U.S. Cl. ...................................... 425/113; 366/76; 366/156; 425/122; 425/133.1; 425/376 R
[58] Field of Search ............... 366/76, 156; 425/131.1, 425/133.1, 376 R, 113, 122

[56] References Cited

U.S. PATENT DOCUMENTS

| | | | |
|---|---|---|---|
| 1,681,566 | 8/1928 | Anderegg | 425/113 |
| 2,653,351 | 9/1953 | Henning | 425/197 |
| 3,577,588 | 5/1971 | Chisholm | 425/131.1 |
| 4,167,383 | 9/1979 | Murakami et al. | 425/133.1 |
| 4,182,603 | 1/1980 | Knittel | 425/133.1 |
| 4,185,954 | 1/1980 | Murakami et al. | 425/133.1 |
| 4,473,299 | 9/1984 | Gulbert | 366/76 |
| 4,492,549 | 1/1985 | Rasmussen | 425/131.1 |

Primary Examiner—Willard E. Hoag
Attorney, Agent, or Firm—Scully, Scott, Murphy & Presser

[57] ABSTRACT

A double extruder for the production of a two-layer tubular extruded product, which extruder comprises a treating screw (8) rotatably mounted in a housing provided in a frame (2) and forming a ring-shaped treating space (21) between the frame and the screw, and inlet and outlet channels (13, 22, 23) extending to the periphery of the treating screw for supplying materials to be extruded into the treating space and for discharging the materials therefrom, and extrusion means (14) mounted in the frame and communicating with the outlet channel. The treating screw is tubular and forms two separate treating spaces together with the frame, each space extending from the outer periphery of the treating screw around the end edge to the inner periphery of the screw. The outlet channel is ring-shaped and joins radially the inner periphery of the tubular treating screw.

10 Claims, 7 Drawing Figures

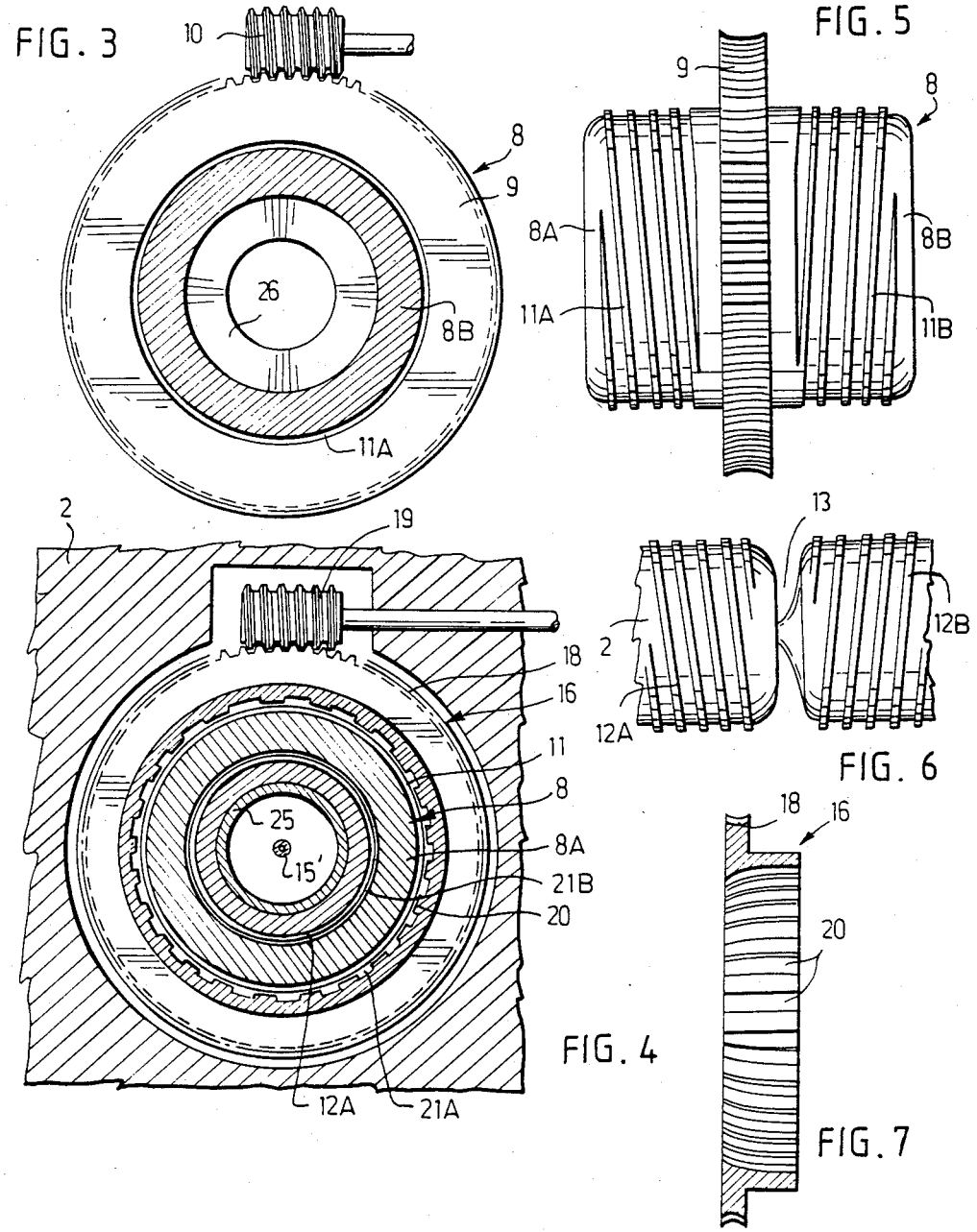

DOUBLE EXTRUDER FOR THE PRODUCTION OF A TWO-LAYER TUBULAR EXTRUDED PRODUCT

This invention relates to a double extruder for plastic materials for the production of a two-layer tubular extruded product, which extruder comprises
a frame,
a cylindrical treating screw rotatably mounted in a housing provided in said frame, said screw forming a ring-shaped treating space between the frame and the screw,
inlet channels provided in the frame and extending to the periphery of the screw for supplying materials to be extruded into said treating space,
an outlet channel provided in the frame and extending to the periphery of the screw for discharging the materials to be extruded from the treating space, and
extrusion means mounted in the frame in communication with said outlet channel.

It is well-known from the extrusion of plastics and similar plasticizable materials that different materials require a different kind of agitation and plasticization treatment. For the adjustment of said treatment so that it meets the requirements of the used material, it has previously been common in the production of a two-layer extruded product to treat each of the two materials in an extruder of its own in order to provide plastic mass flows which thereafter have been joined in a special extrusion die for the extrusion of a final two-layer product.

A disadvantage of such a use of separate extruders is, however, that the mass flows must be transported over relatively long distances after the plasticization phase before they can be joined and extruded. In other words, it is advantageous to get the material extruded without any longer transportation after the plasticized condition has been achieved. In addition, the required equipment is rather large and complicated.

U.S. Pat. No. 3,577,588 discloses an extruder, wherein the feeding screw is formed by two screw threads, which have opposite pitches and are mounted on a common shaft. A cylindrical frame surrounding the feeding screw is provided with two inlets positioned at opposite ends of the feeding screw and with a common outlet positioned in the mid section of the feeding screw. The cited extruder is provided with double feeding means for balancing of the axial thrust force exerted on the feeding screw and, besides, the extruder is not suitable for the production of a two-layer tubular extruded product, because the different materials fed by the two screw threads would be mixed together at the common outlet.

German Patent Specification No. 822,261 discloses a double extruder, wherein the feeding screw is a rotating disc plate. Each flat surface of the plate is provided with a treating space formed by a spiral groove for the material. The frame is provided with two inlets communicating with separate treating spaces and an outlet channel for the plasticized mass flow is provided for each treating space, said channels leading to an extrusion die provided in the middle of the disc. This kind of extruder, however, is not particularly suitable for two different materials, because the separate mass flows must be passed to the extrusion die through separate outlet channels.

U.S. Pat. No. 2,653,351 discloses an extruder, wherein the material to be extruded is exposed to an agitation and plasticization treatment by passing the material axially to and fro through a multi-layer treatment space which is formed between a frame, a bushing-shaped feeding screw, a co-axial feeding spindle mounted inside said screw, and a bushing-shaped frame portion provided between said elements, when the feeding screw and the feeding spindle rotate with respect to the frame. However, this kind of extruder is suitable for extrusion of one material only.

The object of this invention is to provide a double extruder which avoids the above disadvantages and enables a more purposeful transportion of the two materials to be extruded through the extruder as well as a joint discharge of the materials from the extruder in tubular layers. This object is achieved by means of an extruder according to the invention, which is characterized in that
the treating screw is tubular and forms with the frame two separate treating spaces, each space extending from the outer periphery of the treating screw around the end edge to the inner periphery of said treating screw, and
that the outlet channel is ring-shaped and joins radially the inner periphery of the treating screw.

The invention is based on the idea that a tubular treating screw, into which the different materials are fed essentially in the mid section to the outer surface of the treating screw, enables the materials to be passed in axially opposite directions and to be deviated at the ends of the tubular treating screw to move towards each other on the inner surface of the screw, so that the both mass flows can be joined and passed as a joint radial flow into the extrusion means through a common outlet channel. Accordingly, a treating space having a U-shaped cross-section is provided for each mass flow, whereby one branch of the treating space forms a feeding space and the otter branch forms a plasticization space, wherefrom the mass flow is passed directly into a radial ring-shaped outlet channel. The mass flows of the two materials thereby meet each other and flow in parallell in the same radial direction, which is advantageous with respect to an undisturbed layer formation of the materials.

It is advantageous that a feeding ring, which is rotatable with respect to the treating screw, is mounted on each half of the tubular treating screw to surround said feeding space. The feeding rings are intended to control the feeding of the mass separately for each of the two mass flows. This enables an independent adjustment of the quantity and quality of the agitation, i.e. of the shearing effect exerted on the material by each half of one and the same treating screw, and, accordingly, of the viscosity and other properties of the mass flow provided by the each half of the treating screw, by varying the speed of rotation of the feeding rings of the extruder.

Figure 2:
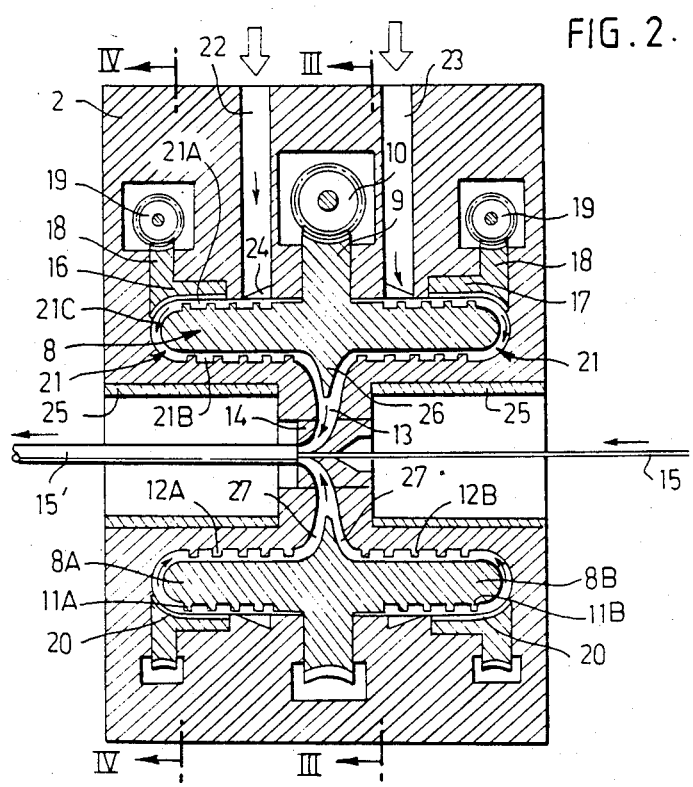

The invention will be described more closely in the following with reference to the attached drawings, wherein FIG. 1 is an end view of one preferred embodiment of a double extruder according to the invention, FIG. 2 is an axial section of a frame and a treating screw of the extruder FIG. 3 illustrates the treating screw in a section along the line III—III in FIG. 2, FIG. 4 illustrates the frame and the treating screw in a section along the line IV—IV in FIG. 2, FIG. 5 is a side view of the treating screw, FIG. 6 is a side view of the inside of the frame, and FIG. 7 is an axial section of a feeding ring.

The double extruder illustrated in FIG. 1 comprises a base 1, a frame 2 supported by said base, motors 3, 4, 5 mounted on said frame, and feeding hoppers 6, 7 supported by the frame. For the sake of clarity, the position of the motors and the feeding hoppers shown in FIG. 2 differs slightly from the position shown in FIG. 1.

A tubular treating screw 8 is rotatably mounted in said frame 2 so that the screw is rotatable around its axis. The treating screw is provided with an external tooth rim 9 which is positioned in the middle of the screw and which is in contact with a spiral wheel 10 operated by the motor.

The outer surface of each of the tubular halves 8A, 8B of the treating screw is provided with a thread 11A, 11B extending around the respective half, said threads having opposite pitches, as appears from FIG. 5. The centre portion of the frame positioned opposite the inner surface of each of the two halves is provided with a thread 12A, 12B extending around the outer surface of said centre portion. The threads have opposite pitches, as appears from FIG. 6. The arrangement is thus such that the ridges of the threads 11A, 11B of the treating screw extend close to the opposite cylindrical surface of the frame and the ridges of the threads 12A, 12B of the centre portion of the frame correspondingly extend close to the opposite cylindrical surface of the treating screw.

A ring-shaped, in the radial direction inwardly converging outlet channel 13 is provided between the threads of the centre portion of the frame. The channel extends towards the axis of rotation and curves into a forming tool 14, which is mounted centrally in the centre portion of the frame and forms an extrusion die. In FIG. 2, a conductor passing through the tool is indicated by the reference numeral 15 and a two-layer coating extruded around said conductor by the reference numeral 15'.

The frame is further provided with feeding rings 16 and 17, which are rotatably mounted on the respective two halves of the treating screw to surround said halves externally. The axis of rotation of said rings coincides with the axis of rotation of the treating screw. The feeding ring is provided with a tooth rim 18, which is in contact with a spiral wheel 19 operated by the motor. The inner surface of the feeding ring is provided with axial grooves and teeth 20. The arrangement is such that the ridges of the teeth of the feeding ring extend close to the ridges of the corresponding thread of the treating screw. Thereby, the frame is provided with a treating space 21 which is positioned on each half of the treating screw between the treating screw and the frame. The space has a U-shaped axial cross-section and comprises an external cylindrical feeding space 21A, an internal cylindrical plasticization space 21B and a ring-shaped displacing space 21C connecting the feeding and plasticization spaces.

The frame is provided with two inlet channels 22, 23 positioned on opposite sides of the tooth rim of the treating screw, each channel ending in a ring-shaped distribution channel 24 surrounding the treating screw.

The double extruder operates as follows:

The materials to be extruded are fed into the inlet channels 22 and 23 respectively through separate hoppers and further into the distribution channels 24. The treating screw 8 is rotated by means of the spiral wheel in such a direction that the threads 11A, 11B of the treating screw tend to displace said materials from the feeding spaces towards the end edges of the treating screw.

The feeding rings 16, 17 are rotated simultaneously by means of the spiral wheels thereof. If the speed of rotation of the feeding ring is equal to that of the treating screw, the feeding ring is maintained stationary with respect to the treating screw and does not essentially accelerate or retard the axial movement of the material. If the feeding ring rotates at a slower speed in the same direction as the treating screw, the feeding ring tends to accelerate the axial movement of the material, and if the feeding ring rotates at a higher speed, the feeding ring tends to retard said axial movement. The quantity and quality as well as the duration of the agitation i.e. the shearing effect caused by the extruder can be adjusted by adjusting the mutual speed ratio in a manner known per se. The materials are plasticized by means of frictional heat and, when necessary, by means of heating devices 25 mounted in the frame.

The mass flows pass from the feeding spaces into the plasticization spaces 21B through the displacing spaces 21C. In the plasticization spaces the mass flows are exposed to compression and obtain a homogenous plasticity after having flown through said spaces. From the plasticization spaces the mass flows pass axially towards the mid section of the treating screw, but are deviated to form radial flows by means of a ring-shaped projection 26 provided on the inner periphery of the treating screw. Said projection forms a connection channel 27 between each plasticization space and the outlet channel 13 so that the two mass flows are kept apart until they in a radial direction join each other in the outlet channel 13. The mass flows pass from the outlet channel into the forming tool 14, wherein they are extruded around the conductor in superimposed cylindrical layers.

It is noted that by means of one treating screw two mass flows can be caused to join under advantageous flowing conditions and, further, to be extruded to form a desired two-layer, tubular product almost immediately after the plasticization phase. In a similar manner, two different materials to be extruded can be treated by means of one treating screw because the feeding rings enable a control of the agitation and the amount of mass flow of each material to be performed independently of each other.

The drawings and the description relating thereto are only intended to illustrate the idea of the invention. In its details, the extruder according to the invention may vary within the scope of the claims. Although the described embodiment concerns coating of a conductor with a two-layer coating, the extruder according to the invention can be used for the production of hoselike two-layer products, too.

I claim:

1. A double extruder for plastic materials for the production of a two-layer tubular extruded product, which extruder comprises a frame (2), a cylindrical treating screw (8) rotatably mounted in a housing provided in said frame, said screw forming a ring-shaped treating space (21) between the frame and the screw, inlet channels (22, 23) provided in the frame and extending to the periphery of the screw for supplying materials to be extruded into said treating space, an outlet channel (13) provided in the frame and extending to the periphery of the screw for discharging the materials to be extruded from the treating space, and extrusion means (14) mounted in the frame in communication with said outlet channel, characterized in that the treating screw (8) is tubular and forms with the frame (2) two separate treating spaces (21), each space extending from the outer periphery of the treating screw around the end edge to the inner periphery of said treating screw, and that the outlet channel (13) is ring-shaped and joins radially the inner periphery of the treating screw (8).

2. Extruder according to claim 1, characterized in that each half (8A, 8B) of the tubular treating screw (8) is surrounded by a feeding ring (16, 17) rotatably mounted in the frame (2), the inner peripheries of said feeding rings defining the respective treating spaces (21).

3. Extruder according to claim 2, characterized in that the tubular treating screw (8) and the feeding rings (16, 17) are provided with external tooth rims (18) in engagement with operating means (19) mounted on the frame (2) for rotating the treating screw and the feeding rings coaxially with respect to each other.

4. Extruder according to claim 2 or 3, characterized in that the cylindrical outer surface of the tubular treating screw (8) is provided with two threads (11A, 11B) having opposite pitches, which threads extend around the two halves (8A, 8B) of the treating screw and have one end in communication with the inlet channel (22, 23) provided in the frame and the other end in communication with a ring-shaped displacing space (21C) which surrounds the respective end edge of the treating screw, whereby each thread forms a spiral-shaped feeding space defined by the frame.

5. Extruder according to claim 4, characterized in that the frame (2) is provided with two threads (12A, 12B) having opposite pitches, which threads are positioned opposite the cylindrical inner surface of the tubular treating screw (8) and extend inside the two halves (8A, 8B) of the treating screw, one end of said threads communicating with a ring-shaped displacing space (21C) surrounding the respective end edge of the treating screw and the other end communicating with a common radial outlet channel (13) provided in the frame, whereby each thread forms a spiral-shaped plasticization space (21B) defined by the treating screw.

6. Extruder according to claim 5, characterized in that said plasticization spaces (21B) are separated from each other by means of a ring-shaped projection (26) and that said plasticization spaces communicate with a radial ring-shaped outlet channel (13) through connection channels (27) which are separated from each other by said projection and which channels convert the axial movements of the mass flows from the plasticization spaces into radial movements before said common outlet channel.

7. Extruder according to claim 6, characterized in that the ring-shaped projection (26) is formed in the cylindrical inner surface of the tubular treating screw (8).

8. Extruder according to claim 4, characterized in that the threads (11A, 11B) provided in the outer surface of the tubular treating screw (8) are at least partly surrounded by the feeding rings (16, 17).

9. Extruder according to claim 8, characterized in that the inner surface of the feeding rings (16, 17) positioned opposite the threads (11A, 11B) is grooved by adjacent axial grooves (20).

10. Extruder according to claim 5, characterized in that each treating space (21) comprises a cylindrical feeding space (21A), a ring-shaped displacing space (21C) and a cylindrical plasticization space (21B) forming a U-shaped axial cross-section.

* * * * *